INVENTOR.
William R. Kehoe
BY Ralph Hammar

United States Patent Office 2,898,928
Patented Aug. 11, 1959

2,898,928

GAS PRESSURE REGULATOR

William R. Kehoe, Erie, Pa., assignor to American Meter Company, Incorporated, Erie, Pa., a corporation of Delaware Application March 10, 1955, Serial No. 493,447

3 Claims. (Cl. 137—80)

In low pressure gas distribution systems, the main pressure is controlled so that individual pressure regulators will not be needed at each house meter. A constant main pressure would not produce the most satisfactory service since the pressure drop in the mains would make the house pressure too low when the demand was high due to low outside temperature or any other factor increasing the gas consumption. Conversely, when the demand was low, the house pressure would be higher than necessary increasing the gas loss due to leakage from the mains.

This invention is intended to control the gas pressure in accordance with demand or temperature so the pressure is kept at but not above the value required for efficient service. In a preferred form, it utilizes a temperature controlled regulator and a demand controlled regulator acting in parallel to load one or more pressure control valves which control the main pressure.

Figure 1:
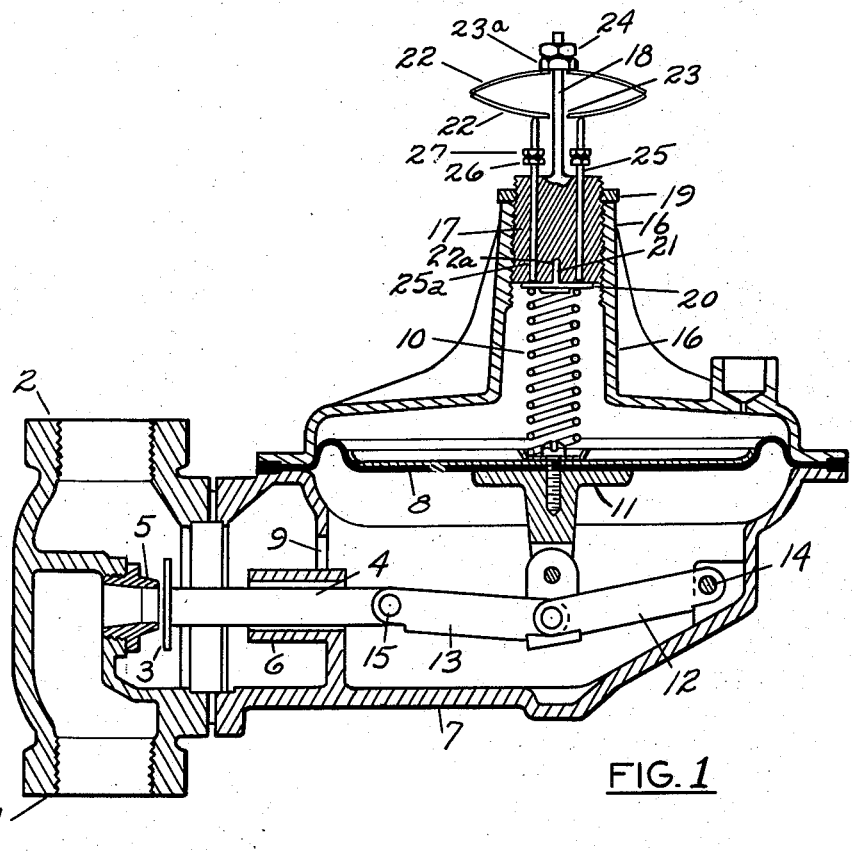
Figure 2:
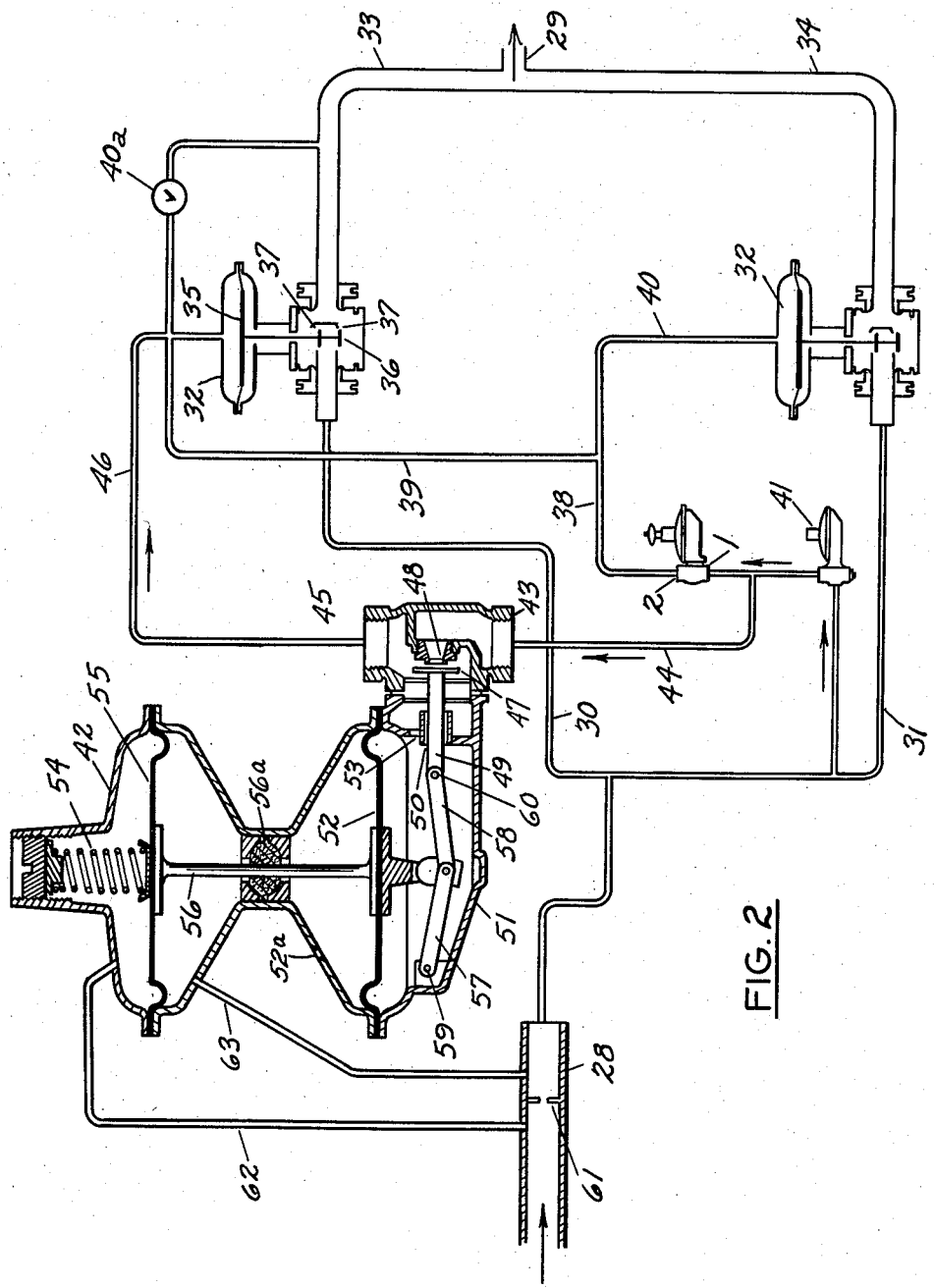

In the accompanying drawing, Fig. 1 is a section through a temperature controlled pressure regulator and Fig. 2 is a system diagram showing demand and temperature controlled pressure regulators acting in parallel to control the gas main pressure.

In Fig. 1 of the drawing is shown a temperature controlled gas pressure regulator having an inlet 1 for connection to the inlet side of the gas line and an outlet 2 for connection to a line in which the pressure is to be controlled. The pressure at the inlet line may vary considerably and the pressure in the outlet is to be controlled to a value correlated with pressure independent of the inlet pressure. The control is effected by a valve member 3 fixed to a plunger 4 and movable toward and away from a valve seat 5 to have the desired throttling effect on the incoming pressure so as to regulate the outlet pressure. The plunger 4 is slidable in a guideway 6 in a diaphragm chamber or body 7. The outlet pressure acts on the underside of a diaphragm 8 through a way 9. On the upper side of the diaphragm is a spring 10 which exerts a downward pressure on the diaphragm 8. The position of the diaphragm accordingly depends upon the force exerted by the spring 10 and the outlet pressure exerted on the underside of the diaphragm. At the center of the underside of the diaphragm is a rigid member 11 pivotally connected to the center of toggle links 12 and 13. The link 12 is pivoted at 14 to the diaphragm casing 7 and the link 13 is pivoted at 15 to the plunger 4. The vertical position of the diaphragm 8 accordingly determines the position of the valve member 3 with reference to the seat 5 and thereby controls the flow of gas to the outlet 2 in accordance with the outlet pressure. The parts so far described are typical of gas pressure regulator constructions and may differ substantially in appearance from the precise construction illustrated.

On the upper side of the diaphragm housing is a cylindrical projection 16 internally threaded at its upper end to receive a spring pressure adjusting nut 17. The nut has integral with its upper side a stem 18 which projects above the cylindrical projection 16 so as to be readily accessible for adjustment. The nut 17 is locked in its adjusted position by a lock nut 19. On the under side of the nut 17 is a spring seat member 20 having a stem 21 guided in a central opening 22a in the nut. The spring seat member 20 engages the upper end of the spring 10 and determines the minimum spring pressure exerted by the spring. The adjustment of the nut 17, accordingly determines the minimum outlet pressure appearing in the outlet 2 of the pressure regulator.

In order to increase the pressure appearing in the outlet 2 when the ambient temperature drops, there is mounted on the stem 18 suitable thermostatic means such as, for example, the oppositely dished bi-metal members 22. Each of the members has a clearance opening 23 at the center. The upper member 22 bears against an adjustable nut 23a threaded on the stem 17 and locked in place by a lock nut 24. The lower bi-metal member 22 bears against the upper ends of rods 25 slidable in the adjusting nut 17 and having lower ends 25a which bear against the upper side of the spring seat member 20. Threaded on the rods 25 are stop nuts 26 which are locked in place by lock nuts 27. The purpose of the stop nuts 26 is to limit the downward movement of the rods 25.

In the position illustrated, the spring seat member 20 is against the lower end of the nut 17 and accordingly the pressure exerted by the spring 10 is controlled solely by the adjusting nut 17. When the ambient temperature drops below a pre-selected value which may be, for example, somewhere between 50 and 65 degrees, the bi-metal members 22 bow outwardly or increase in curvature so as to exert a downward pressure on the upper ends of the rods 25 proportional to the drop in temperature below the pre-selected value. The downward pressure on the rods 25 moves the spring seat member 20 down away from the lower end of the adjusting nut 17 and increases the pressure exerted by the spring 10 on the upper surface of the diaphragm 8 and accordingly increases the regulated pressure appearing at the outlet 2. The bi-metal members can effect a substantially linear increase in the regulated output pressure proportional to the drop in ambient temperature below the pre-selected 50-65 degree temperature. When the ambient temperature reaches too low a value, for example, 10-25 degrees, the stop nuts 26 butt against the upper end of the adjusting nut 17 and no further increase in the regulated output pressure of the regulator is obtained.

The regulator accordingly provides a minimum output pressure whenever the ambient temperature is above the pre-selected value, and a maximum output pressure whenever the ambient temperature drops below another pre-selected lower value. Between these two pre-selected temperatures the output pressure varies linearly from between the minimum and maximum and thereby provides the additional gas pressure needed to force gas through the distribution lines when the gas demand increases due to the increased heating load resulting from the ambient temperature drop. It will be noted that all of the adjustments are independent of each other.

Fig. 2 shows a gas distribution system using the Fig. 1 regulator and other associated equipment to control the pressure in the gas distribution mains. In this diagram, the incoming gas main is shown at 28 and the outgoing gas main in which the pressure is to be regulated is shown at 29. The incoming gas main 28 branches into two branch lines 30 and 31 each having a gas pressure regulating valve 32 controlling the pressure in branch lines 33 and 34 which converge to the outlet line 29. The gas pressure regulating valves are of the balanced diaphragm type having a diaphragm 35 fixed to the upper end of a valve stem member carrying valve members 36 which co-operate with ways 37 to control the pressure appearing in the outlet lines 33 or 34 as the case may be. The pressure on the underside of the diaphragms 35 is the outlet pressure. The pressure on the upper side of the diaphragms 35 is the pressure obtained from the outlet 2 of the temperature compensated regulator. This pressure is connected to the upper side of the diaphragm 35 by lines 38, 39 and 40. By having the pressure at the outlet 2 slightly greater than the pressure in the main outlet 29, the pressure from the upper sides of the diaphragms 35 can be bled through a needle valve restriction 40a direct to the outlet main 29. Since the pressure derived from the temperature compensated gas regulator varies with temperature, the pressure in the outlet main 29 will have a corresponding variation. As the pressure on the upper side of the diaphragm 35 increases, the valve members 36 move downward and have less throttling action so that the outlet pressure in the main 29 rises to correspond with the output pressure of the temperature compensated regulator.

If the incoming main pressure varies too widely it may be desirable to connect the temperature compensated gas regulator to the line 31 through a regulator 41 which irons out extreme fluctuations in the main pressure. If the incoming main pressure does not vary widely, the regulator 41 will not be necessary.

While the system so far described increases the outgoing main pressure with falling temperature so as to anticipate the added requirements for gas resulting from the increased heating load there may be other conditions in which the demand for gas increases even though the temperature has not fallen. In order to take care of this situation, there is provided another gas pressure regulator indicated generally at 42 and having an inlet 43 connected by a line 44 to the outlet of the pressure regulator 41 and having an outlet 45 connected by a line 46 to the line 39 leading to the upper side of the diaphragms 35 in the pressure regulating valves. The output pressure on the pressure regulator 42 is controlled by a valve member 47 co-operating with a valve seat 48. The valve member 47 is fixed to a plunger 49 slidable in a guide way 50 forming part of the pressure regulator casing 51. In the casing is a diaphragm 52 having its under side supplied from the output pressure through a passageway 53 and having its upper side loaded by a spring 54 and a diaphragm 55 through a rod 56 slidable through packing 56a. A suitable vent 52a is provided in the chamber between the upper side of the diaphragm 52 and the packing 56a. The under side of the diaphragm 52 is connected to toggled links 57 and 58, the link 57 being pivoted at 59 on the casing and the link 58 being pivoted at 60 to the plunger 49. Up and down movement of the diaphragm 52 accordingly controls the separation of the valve member 47 from the valve seat 48 and thereby varies the throttling action so as to control the pressure appearing in the output 45. Since the output from the pressure regulator 42 is connected to the same lines 39 and 40 receiving the output from the temperature compensated pressure regulator, obviously only the higher of these pressures will be effective on the pressure regulating valves to control the pressure in the output main 29. When the output pressure of the pressure regulator 42 is higher, it controls the pressure in the main 29. Conversely, when the output of the pressure regulator 42 is lower, it has no effect upon the pressure in the main 29.

In order that the output of the pressure regulator 42 may be increased as the demand for gas increases, there is arranged in the incoming gas main 28 an orifice plate 61 or other suitable differential pressure producer. The upper side of the diaphragm 55 is connected through a line 62 to the incoming gas main 28 upstream of the orifice plate 61. The under side of the diaphragm 55 is connected through a line 63 to the main 28 on the downstream side of the orifice plate 61. As the flow of gas through the main 28 increases, the pressure drop across the orifice plate 61 increases and accordingly the differential pressure on the upper and lower sides of the diaphragm increases and exerts a downward loading force on the pressure regulating diaphragm 52 tending to move the valve member 47 away from the valve seat 48 and decrease the throttling action so as to increase the pressure appearing in the line 46.

In this system, the regulation of the pressure in the output main 29 is accordingly increased by the pressure regulator 42 whenever the demand for gas increases and is increased by the temperature compensated regulator whenever the temperature drops and it is anticipated that there will be an increased demand for gas because of the increased heating load accompanying the falling temperature. The two regulators supplement each other. The temperature compensation provides the increased output pressure in anticipation of increased demand for gas and the demand responsive pressure regulator 42 provides the increased pressure necessary to supply the actual increased demand for gas. Because the two regulators are connected in parallel, only the one with the higher pressure output controls the resultant regulated pressure in the gas output main 29.

What is claimed as new is:

1. In a gas distribution system, a pressure regulator loaded in response to the pressure drop due to the flow of gas in a line, another pressure regulator loaded in response to the drop in ambient temperature, a line pressure regulator valve having a diaphragm loaded in parallel from the output pressures of both pressure regulators whereby the resultant line pressure is increased in proportion to the increase in flow in the line or to the drop in ambient temperature whichever is the greater, and means for bleeding the pressure applied to said diaphragm.

2. In a gas pressure regulator having a diaphragm loaded on one side by the regulator output pressure and on the other side by a spring, a slidable seat for the end of the spring remote from the diaphragm, an adjustable abutment for the spring seat setting the initial spring tension, a thermostatic element responsive to ambient temperature, thrust means extending slidably through the abutment and from the thermostatic means to the spring seat for engaging the spring seat and exerting a force on the spring increasing the spring tension with a drop in the ambient temperature whenever the ambient temperature is below a preselected value, said thrust means being out of engagement with the spring seat whenever the ambient temperature is above said preselected value, and means stopping the movement of the thrust means at a predetermined drop in temperature below said preselected value.

3. In a gas pressure regulator having a diaphragm loaded on one side by the regulator output pressure and on the other side by a spring, a slidable seat for the end of the spring remote from the diaphragm, a threaded abutment for the spring seat setting the initial spring tension, a stem of the abutment extending away from the spring seat for turning the abutment to adjust the spring tension, a thermostatic element on said stem, and thrust rods slidable through the abutment extending between the thermostatic element and the spring seat for engaging the spring seat and exerting a force on the spring varying the spring tension with the ambient temperature whenever the ambient temperature is below a preselected value, said thrust means being out of engagement with the spring seat whenever the ambient temperature is above said preselected value.

(References on following page)

References Cited in the file of this patent

UNITED STATES PATENTS

| Number | Name | Date |
|---|---|---|
| 853,503 | Eddy | May 14, 1907 |
| 930,158 | Connet | Aug. 3, 1909 |
| 1,452,265 | Collins et al. | Apr. 17, 1923 |
| 1,547,269 | Spencer | July 28, 1925 |
| 1,662,289 | Whitehead | Mar. 13, 1928 |
| 1,787,686 | Kerr | Jan. 6, 1931 |
| 1,834,375 | Bletz | Dec. 1, 1931 |
| 2,212,285 | Ayers | Aug. 20, 1940 |
| 2,231,696 | Wolfe | Feb. 11, 1941 |
| 2,369,887 | Eckman | Feb. 20, 1945 |